C. H. CRAIG.
MEASURING INSTRUMENT FOR TAILORS.
APPLICATION FILED MAY 29, 1916.
1,225,930.
Patented May 15, 1917.
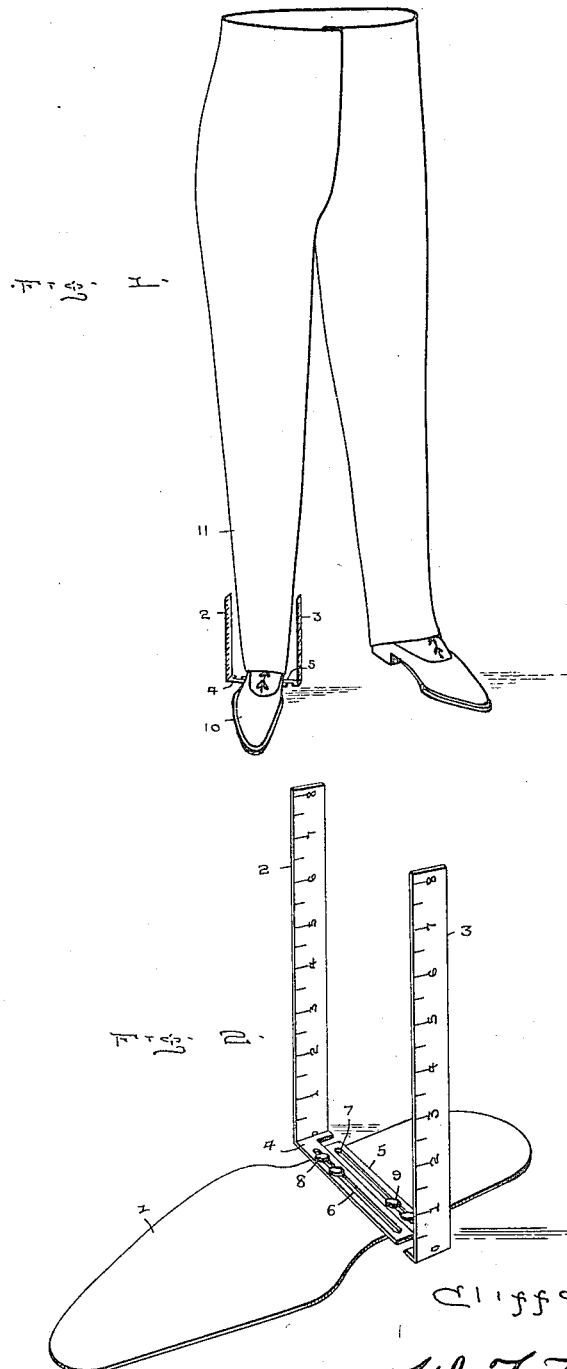

UNITED STATES PATENT OFFICE.

CLIFFORD H. CRAIG, OF REDSTONE, NEW HAMPSHIRE.

MEASURING INSTRUMENT FOR TAILORS.

1,225,930.

Specification of Letters Patent.

Patented May 15, 1917.

Application filed May 29, 1916. Serial No. 100,634.

*To all whom it may concern:*

Be it known that I, CLIFFORD H. CRAIG, a citizen of the United States, residing at Redstone, in the county of Carroll and State of New Hampshire, have invented certain new and useful Improvements in Measuring Instruments for Tailors; and I do hereby declare the following to be a full, clear, and exact description of the invention, such as will enable others skilled in the art to which it appertains to make and use the same.

My invention relates to new and useful improvements in measuring instruments for tailors, and my object is to provide means to determine the correct height of the trouser's legs from the floor.

A further object is to so construct the device that the measurements may be quickly obtained both at the inside and outside edges of the trousers whereby the two edges will be of uniform distance from the floor.

A further object is to provide means for retaining the measuring device in proper position.

And a further object is to provide means for adjusting the measuring device.

Other objects and advantages will be hereinafter set forth and more particularly pointed out in the accompanying specification.

In the accompanying drawings which are made a part of this application,

Figure 1 is a perspective view of the measuring device as applied to use, and

Fig. 2 is a perspective view thereof when not in use.

Referring to the drawings in which similar reference numerals designate corresponding parts throughout the several views, 1 indicates a base plate which is adapted to rest upon the floor, or other object and 2 and 3 indicate rules graduated to inches and fractions thereof, which rules extend at right angles to the trend of the base plate and are adjustably attached to the base plate by providing angular extensions 4 and 5 at the lower ends of the rules 2 and 3 respectively, said extensions being substantially one-half the width of the ruler and abut against each other when applied to the base plate, said extensions having elongated slots 6 and 7, through which extend clamping screws 8 and 9 respectively, said screws being threaded into the base plate and clamp the extensions in adjusted position with respect to the base plate. By attaching the rulers to the base plate in this manner, they may be separated or brought toward each other, as occasion may require.

In applying the device to use the foot 10 of the customer is placed upon the base plate 1 so as to position the rulers adjacent the heel of the customer, the leg 11 of the trousers passing between the rulers, and in determining the measurements, the customer suggests the desired height of the legs of the trousers above the floor, when the tailor applies the measuring tape to determine the length of the trousers in the usual manner, and supposing the customer desires the bottom of the legs of the trousers to be three inches from the floor line, the tailor measures downwardly from the waist band of the trousers to the three inch scale on the ruler at the outside of the foot, which will indicate the length of the trousers on the outside, while the inside measurement is determined in the same manner by extending the tape from the crotch of the trousers to the three inch scale on the ruler at the inside of the foot.

By making the measurements in this manner the outer and inner edges of the trouser's leg will be exactly the same height from the floor, thereby avoiding any possibility of making a mistake, as is frequently done when measuring in the old way.

And it will likewise be seen that the measurements can be more quickly made than when determining the height of the trousers above the floor, without the use of the ruler.

I claim:—

1. A device of the class described comprising a foot plate embodying a heel and a toe portion, spaced rulers disposed at right angles to the plane of the foot plate, extensions carried by the lower ends of said rulers and disposed transversely of the foot plate between the heel and toe portion thereof, and means for adjustably connecting said extensions to said foot plate.

2. A device of the class described comprising a foot plate embodying a heel and toe portion, spaced rulers disposed at right angles to the plane of said foot plate, extensions carried by the lower ends of said rulers and disposed transversely of the foot plate in overlapping relation to each other, said extensions being each provided with a longitudinal slot, and a clamping screw extending through each of said slots and into the base plate whereby the spaced rulers may be adjusted relatively to one another.

In testimony whereof I have signed my name to this specification in the presence of two subscribing witnesses.

CLIFFORD H. CRAIG.

Witnesses:
THOMAS SAWYER,
F. B. MASTERTON.

Copies of this patent may be obtained for five cents each, by addressing the "Commissioner of Patents, Washington, D. C."